United States Patent
Newman et al.

(10) Patent No.: US 11,558,236 B1
(45) Date of Patent: Jan. 17, 2023

(54) SINGLE-BRANCH REFERENCE FOR HIGH-FREQUENCY PHASE TRACKING IN 5G AND 6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(73) Assignee: ULTRALOGIC 6G, LLC, Palos Verdes Estates, CA (US)

( * ) Notice: Subject to any disclaimer, the term of this patent is extended or adjusted under 35 U.S.C. 154(b) by 0 days.

(21) Appl. No.: 17/964,330

(22) Filed: Oct. 12, 2022

Related U.S. Application Data

(60) Provisional application No. 63/403,924, filed on Sep. 6, 2022, provisional application No. 63/409,888, filed on Sep. 26, 2022.

(51) Int. Cl.
*H04L 27/38* (2006.01)
*H04L 27/36* (2006.01)
*H04L 25/03* (2006.01)

(52) U.S. Cl.
CPC .... *H04L 27/3872* (2013.01); *H04L 25/03006* (2013.01); *H04L 27/36* (2013.01)

(58) Field of Classification Search
CPC ........... H04L 27/3872; H04L 25/03006; H04L 27/36
See application file for complete search history.

(56) References Cited

U.S. PATENT DOCUMENTS

| | | | | |
|---|---|---|---|---|
| 3,792,364 A | * | 2/1974 | Ananias | H03D 1/24 375/321 |
| 6,249,180 B1 | * | 6/2001 | Maalej | H04L 27/3809 329/304 |
| 2004/0114692 A1 | | 6/2004 | Matsumoto | |
| 2010/0225752 A1 | * | 9/2010 | Bench | H04L 27/3455 375/261 |
| 2017/0180179 A1 | | 6/2017 | Shi | |
| 2018/0132122 A1 | | 5/2018 | Yoo | |
| 2018/0227154 A1 | * | 8/2018 | Glattli | H03C 1/52 |
| 2018/0227929 A1 | | 8/2018 | Yoo | |
| 2018/0367275 A1 | | 12/2018 | Nammi | |
| 2019/0190677 A1 | | 6/2019 | Kim | |

(Continued)

*Primary Examiner* — Dac V Ha
(74) *Attorney, Agent, or Firm* — Mayer & Williams PC

(57) ABSTRACT

A method is disclosed for mitigating phase noise at high frequencies in 5G and 6G. Quadrature modulation schemes, in which orthogonal branches are amplitude modulated, are susceptible to phase noise which rotates the branches, causing demodulation faults. Disclosed is a single-branch reference signal that can mitigate phase noise. The transmitter can transmit a particular resource element having a normal amplitude in one branch, and zero amplitude in the orthogonal branch. The receiver can then measure the amplitudes of the particular resource element as-received (with phase noise), and determine a phase rotation angle according to a ratio of the two branch amplitudes. The receiver can then correct the branch amplitudes of each message element, and thereby negate the effect of the phase noise. The disclosed procedures can thereby make high-frequency, high-reliability communication feasible, at extremely low cost.

20 Claims, 4 Drawing Sheets

(56) References Cited

U.S. PATENT DOCUMENTS

| | | |
|---|---|---|
| 2019/0326964 A1 | 10/2019 | Li |
| 2020/0220689 A1 | 7/2020 | Hessler |
| 2020/0220763 A1 | 7/2020 | Montorsi |
| 2020/0322010 A1 | 10/2020 | Kim |
| 2021/0044372 A1 | 2/2021 | Yang |
| 2021/0105166 A1 | 4/2021 | Khoshnevisan |

* cited by examiner

SINGLE-BRANCH REFERENCE FOR HIGH-FREQUENCY PHASE TRACKING IN 5G AND 6G

PRIORITY CLAIMS AND RELATED APPLICATIONS

This application claims the benefit of U.S. Provisional Patent Application Ser. No. 63/403,924, entitled "Phase-Noise Mitigation at High Frequencies in 5G and 6G", filed Sep. 6, 2022, and U.S. Provisional Patent Application Ser. No. 63/409,888, entitled "Single-Branch Reference for High-Frequency Phase Tracking in 5G and 6G", filed Sep. 26, 2022, all of which are hereby incorporated by reference in their entireties.

FIELD OF THE INVENTION

The disclosure pertains to phase-noise mitigation in wireless messaging, and particularly to phase-noise mitigation at high frequencies.

BACKGROUND OF THE INVENTION

Wireless communication at very high frequencies, such as tens to hundreds of GHz, is needed for the massively increased demand in bandwidth and throughput expected in 5G and 6G. However, phase noise is an increasing problem at higher frequencies, preventing full usage of the bandwidth for messaging. What is needed is means for mitigating the phase noise so that the promise of high-speed messaging at high frequencies can be at least partially realized.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a wireless receiver to demodulate a message, the method comprising: receiving a single-branch reference signal comprising a resource element modulated according to a reference I-branch signal multiplexed with an orthogonal reference Q-branch signal; measuring a reference I-branch amplitude of the reference I-branch signal and a reference Q-branch amplitude of the reference Q-branch signal; calculating a phase rotation angle according to a ratio of the reference I-branch amplitude and the reference Q-branch amplitude; receiving a message comprising message elements, each message element modulated according to an I-branch signal having an I-branch amplitude, multiplexed with an orthogonal Q-branch signal having a Q-branch amplitude; adjusting the I-branch amplitude and the Q-branch amplitude according to the phase rotation angle; comparing the adjusted I-branch amplitude to a plurality of predetermined amplitude levels, and selecting which of the predetermined amplitude levels is closest to the adjusted I-branch amplitude; and comparing the adjusted Q-branch amplitude to the plurality of predetermined amplitude levels, and selecting which of the predetermined amplitude levels is closest to the adjusted Q-branch amplitude.

In another aspect, there is a wireless transmitter configured to: use a modulation scheme comprising: a first branch multiplexed with an orthogonal second branch; and a plurality of predetermined amplitude levels; transmit a single-branch reference signal comprising a reference first branch multiplexed with an orthogonal reference second branch, wherein: the reference first branch is amplitude modulated according to one of the predetermined amplitude levels; and the reference second branch amplitude modulated with zero amplitude.

In another aspect, there is non-transitory computer-readable media in a wireless receiver, the media containing instructions that when implemented in a computing environment cause a method to be performed, the method comprising: receiving a single-branch reference signal comprising, in exactly one resource element, a reference I-branch amplitude multiplexed with an orthogonal reference Q-branch amplitude; measuring the reference I-branch amplitude and the reference Q-branch amplitude; calculating a reference sum-signal amplitude comprising a square root of a sum of the reference I-branch amplitude squared plus the reference Q-branch amplitude squared; calculating a reference sum-signal phase comprising an arctangent of a ratio of the reference Q-branch amplitude divided by the reference I-branch amplitude; receiving a message comprising modulated message elements; for each message element: measuring a received I-branch amplitude and a received Q-branch amplitude; calculating a received sum-signal phase according to an arctangent of a ratio of the received Q-branch amplitude divided by the received I-branch amplitude; and calculating an adjusted sum-signal phase by subtracting the reference sum-signal phase from the received sum-signal phase.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
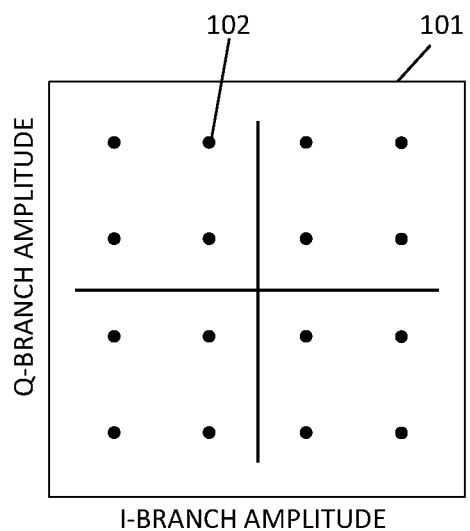
FIG. 1A is a schematic showing an exemplary embodiment of a 16QAM constellation chart, according to prior art.

Systems and methods disclosed herein (the "systems" and "methods", also occasionally termed "embodiments" or "arrangements" or "versions" or "examples", generally according to present principles) can provide urgently needed wireless communication protocols for mitigating the effects of phase noise at high frequencies planned for late 5G and 6G communications. Disclosed herein is a "single-branch reference signal", usually occupying just a single resource element, transmitted with orthogonal I and Q branches, in which the I branch is amplitude modulated according to the one of the predetermined amplitude levels of the modulation scheme, while the Q branch is transmitted with zero power, that is, an amplitude of zero (among other versions). Such a single-branch reference signal may provide both phase tracking and amplitude calibration, according to the sum-signal phase and the sum-signal amplitude of the single-branch reference signal. For example, a receiver can quantitatively determine the effects of phase noise by determining a rotation angle according to a ratio of the as-received Q and I branches. Phase noise generally rotates, or intermingles, the I and Q branches, resulting in a non-zero amplitude in the reference Q branch as-received, even if it is transmitted with zero amplitude. The receiver can calculate the phase rotation angle according to a ratio of the received branch amplitudes. The receiver can then negate phase noise in a message by subtracting that angle from each of the message elements. More specifically, the receiver can negate phase noise in each message element by calculating a sum-signal phase angle of the message element, subtracting the phase angle of the single-branch reference signal from it, calculating the corrected I and Q amplitudes using that corrected phase angle, and then demodulating the message element according to the corrected branch amplitudes, with the phase noise substantially negated.

The method is resource-efficient. Using only one branch of one resource element, the receiver can negate the phase noise in a large number of message elements encoded in an entire OFDM symbol spanning multiple subcarriers and, usually, one or two adjacent OFDM symbols as well. In addition, the receiver can update the amplitude calibration from the other branch, which is generally modulated according to the maximum branch amplitude of the modulation scheme (or the same times $\sqrt{2}$). The single-branch reference signals disclosed herein can negate both amplitude and phase noise, thereby enabling high frequency communications with high reliability, for minimal overhead cost, according to some embodiments.

In one embodiment, the single-branch reference signal is transmitted with the reference I-branch amplitude equal to the maximum branch amplitude level of the modulation scheme, and the reference Q branch with zero amplitude. The sum-signal phase is initially zero degrees in that case, since the reference Q branch is transmitted with zero amplitude. In another embodiment, the reference Q-branch may have the maximum branch amplitude and the reference I-branch may have zero amplitude, such that the initial sum-signal phase is 90 degrees. Upon receiving the single-branch reference signal, the receiver can determine the phase rotation angle by first calculating a reference phase angle equal to the arctangent of a ratio of the branch amplitudes, and then subtracting that angle from a predetermined initial reference phase angle. The difference is the phase rotation angle. For example, when the Q-branch is transmitted with zero amplitude, the initial reference phase angle is zero, in which case the phase rotation angle is equal to the received phase angle. If the single-branch reference signal is configured with the I-branch zero, or some other arrangement of branch amplitudes, then the receiver is expected to know how it is configured so the receiver can calculate the phase rotation angle accordingly.

In some embodiments, one of the branches may have a predetermined amplitude while the other branch has zero amplitude. The predetermined amplitude may be the maximum branch amplitude of the modulation scheme, or the maximum sum-signal amplitude of the modulation scheme (which is $\sqrt{2}$ times the maximum branch amplitude), or other predetermined value. The receiver is expected to know the initial branch amplitude of the single-branch reference signal.

In another embodiment, both branches may have the maximum branch amplitude, in which case the sum-signal phase is 45 degrees. It is immaterial which branch of the single-branch reference signal is selected for zero amplitude, or whether both branches are powered, or other branch-amplitude ratio, so long as the receiver knows the initial sum-signal amplitude and the initial sum-signal phase of the reference signal, and can thereby determine the effects of noise from the received sum-signal amplitude and sum-signal phase. It is generally convenient to transmit one branch with zero amplitude, because the receiver can then measure the rotation angle to high precision according to the received amplitude in the orthogonal component. For best SNR, a large amplitude may be transmitted in the non-zero branch, such as the maximum branch amplitude or the maximum sum-signal amplitude of the modulation scheme, according to some embodiments.

In some embodiments, the single-branch reference signal can be made optional, while in other embodiments, the single-branch reference signals may be automatic or defaulted or compulsory. In some embodiments, a convention or format may be specified in a system information file, such as an SSB (synchronization signal block) or an SIB 1 (system information block number 1) message. The format of the single-branch reference signal may include the initial phase angle of the reference signal (usually zero degrees if the Q-branch amplitude is zero), the initial amplitude level (usually the maximum branch amplitude, or the maximum sum-signal amplitude, of the modulation scheme), among other variables and parameters. "Initial" in this context implies "prior to phase noise distortions".

In some embodiments, the use and format of single-branch reference signals may be uniform and automatic, while in other embodiments, each user may request a custom format, or select a default convention individually. In some embodiments, a system-level convention may specify the use or format of single-branch reference signals, such as specifying a particular configuration under certain conditions, or usage when the frequency is above a certain level. In other embodiments, the use or format of single-branch reference signals may be assigned by the base station, and may optionally be configured in an RAR (radio resource control) message or a Msg4 (fourth message of the 4-step initial access procedure) or MsgB (second message of the 2-step initial access procedure), or other unicast downlink message. In some embodiments, the use or format of the single-branch reference signals may be requested by a user device in an uplink message such as a Msg3 (third message of the 4-step initial access procedure) or MsgA (first message of the 2-step initial access procedure) or other message.

In some embodiments, a single-branch reference signal may be required at the head (initial subcarrier or symbol-time) of a message by default. The leading single-branch reference signal may thereby compensate phase noise in message elements which are (temporally) proximate to the single-branch reference signal. In some embodiments, a base station may provide single-branch reference signals periodically during intervals scheduled for downlink, and optionally in unscheduled intervals as well. For example, the base station can transmit one of the single-branch reference signals in each symbol-time, or one per two symbol-times, or other interval as specified in system information files or conventions. In some embodiments, the use of single-branch reference signals may be different for uplink and downlink messages, such as being provided by the base station in downlink but not by the user device in uplink, or vice-versa. In some embodiments, the use of single-branch reference signals for phase tracking and phase-noise mitigation may depend on the frequency, for example requiring single-branch reference signals at high frequencies, not requiring them at low frequencies, and making them optional at intermediate frequencies. In some embodiments, the use of single-branch reference signals may be based on the rate of phase faults in messages. For example, the receiver can require the use of single-branch reference signals when the rate of phase faults is high, and can decline them when phase faults are below a threshold. In some embodiments, the single-branch reference signals by be provided to each user only if needed. For example, a simple user device with a low-cost semiconductor clock may have more need for phase-noise mitigation than a high-performance user with an atomically stabilized time-base. In some embodiments, each user device that detects phase faults above a certain rate may request the phase-noise mitigation service when needed to achieve a required QoS level, or for message reliability at high frequencies, or to avoid retransmission requests, or to conserve resources, or for other reason.

Since the single-branch reference signals generally occupy only one resource element, and involve transmitted power in only one branch, they impose a negligible resource cost and power overhead, yet provide both phase-noise mitigation and amplitude calibration transparently.

The examples presented below are suitable for adoption by a wireless standards organization. Standardizing the single-branch reference signals may thereby provide the benefits of automatic and transparent phase-noise mitigation at negligible cost in power and resources, and may thereby benefit billions of future wireless users worldwide, in 5G and 6G and beyond.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time", and a specific frequency and bandwidth termed a "subcarrier" (or "sub-channel" in some references). Symbol periods may be termed "OFDM symbols" (Orthogonal Frequency-Division Multiplexing) in references. The time domain may be divided into ten-millisecond frames, one-millisecond sub-frames, and some number of slots, each slot including 14 symbol periods. The number of slots per subframe ranges from 1 to 8 depending on the "numerology" selected. The frequency axis is divided into "resource blocks" (also termed "resource element groups" or "REG" or "channels" in references) including 12 subcarriers, each subcarrier at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. "Classical" amplitude-phase modulation refers to message elements modulated in both amplitude and phase, whereas "quadrature" or "PAM" (pulse-amplitude) modulation refers to two signals, separately amplitude-modulated, and then multiplexed and transmitted with a 90-degree phase shift between them. The two multiplexed signals may be called the "I" and "Q" branch signals (for In-phase and Quadrature-phase) or "real and imaginary" among others. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders. Most of the examples below relate to QPSK or 16QAM, with straightforward extension to the other levels of modulation. QPSK is phase modulated but not amplitude modulated. 16QAM may be modulated according to PAM which exhibits two phase levels at zero and 90 degrees (or in practice, for carrier suppression, ±45 degrees) and four amplitude levels including two positive and two negative amplitude levels, thus forming 16 distinct modulation states. For comparison, classical amplitude-phase modulation in 16QAM includes four positive amplitude levels and four phases of the raw signal, which are multiplexed to produce the 16 states of the modulation scheme. "SNR" (signal-to-noise ratio) and "SINK" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like. An "RF mixer" is a device for multiplying an incoming signal with a local oscillator signal, thereby selecting one component of the incoming signal.

In addition to the 3GPP terms, the following terms are defined herein. Although in references a modulated resource element of a message may be referred to as a "symbol", this may be confused with the same term for a time interval ("symbol-time"), among other things. Therefore, each modulated resource element of a message is referred to as a "modulated message resource element", or more simply as a "message element", in examples below. A "demodulation reference" is a set of Nref modulated "reference resource elements" or "reference elements" modulated according to the modulation scheme of the message and configured to exhibit levels of the modulation scheme (as opposed to conveying data). Thus integer Nref is the number of reference resource elements in the demodulation reference. A "calibration set" is one or more amplitude values (and optionally phase values), which have been determined according to a demodulation reference, representing the predetermined modulation levels of a modulation scheme. A "short-form" demodulation reference is a demodulation reference that exhibits the maximum and minimum amplitude levels of the modulation scheme, from which the receiver can determine any intermediate levels by interpolation. "RF" or radio-frequency refers to electromagnetic waves in the MHz (megahertz) or GHz (gigahertz) frequency ranges. The "raw" signal is the as-received waveform before separation of the quadrature branch signals. "Phase noise" is random noise or time jitter that alters the phase of a received signal, usually without significantly affecting the overall amplitude. "Phase-noise tolerance" is a measure of how much phase alteration can be imposed on an allowed state without causing a demodulation fault. A "faulted" message has at least one incorrectly demodulated message element. A "phase fault" is a message element demodulated as a state differing in phase from the intended modulation state, whereas an "amplitude fault" is a message element demodulated as a state differing in amplitude from the intended modulation state.

Referring to quadrature or PAM modulation, an "I-Q" space is an abstract two-dimensional space defined by an I-branch amplitude and an orthogonal Q-branch amplitude, in which each transmitted message element occupies one of several predetermined I-Q states of a modulation scheme. When the orthogonal branches are called "real" and "imaginary", the I-Q space is sometimes called the "complex plane".

The receiver may process the received signals by determining a "sum-signal", which is the vector sum of the I and Q branch signals. A vector sum is a sum of two vectors, in this case representing the amplitudes and phases of the two orthogonal branches in I-Q space. The sum-signal has a "sum-signal amplitude", equal to the square root of the sum of the I and Q branch amplitudes squared (the "root-sum-square" of I and Q), and a "sum-signal phase", equal to the arctangent of the ratio of the I and Q signal amplitudes (plus an optional base phase, which is ignored herein). When a message element is received at a receiver, the received I and Q amplitudes may be substantially different from the transmitted values due to phase noise, which generally intermingles the two branches. Phase noise tends to change the ratio of I and Q amplitudes, but does not tend to change the overall amplitude of the message element (absent amplifier nonlinearities, which are ignored herein). Therefore, the receiver can correctly demodulate the message by determining a phase rotation angle according to a single-branch reference signal, and then de-rotating the sum-signal phase of each message element to negate phase noise.

Turning now to the figures, a prior-art modulation scheme is susceptible to phase noise at high frequencies.

FIG. 1A is a schematic showing an exemplary embodiment of a 16QAM constellation chart, according to prior art. As depicted in this prior-art example, a modulation scheme 101 includes 16 allowed modulation states 102, each allowed state determined by an I-branch signal and a Q-branch signal orthogonal to the I-branch signal (for example, the Q-branch phase-modulated at 90 degrees relative to the I-branch). The horizontal axis shows the amplitude modulation of the I-branch signal, and the vertical axis shows the amplitude modulation of the Q-branch signal, each branch being amplitude-modulated at one of certain predetermined amplitude levels of the modulation scheme. In this case, the predetermined amplitude levels are −3, −1, +1, and +3 arbitrary units. The various amplitude levels are equally separated and symmetrical around zero. The central cross-shape represents zero amplitude. Negative amplitude levels are equivalent to a 180-degree phase change. There are 16 states, as expected for 16QAM. A receiver can receive a message element modulated according to this modulation scheme, and can extract the I and Q branches separately by analog or digital signal-processing means. The receiver can then measure the amplitudes of those two branches, compare the measured amplitude values to a predetermined set of amplitude levels, select the closest match to each branch amplitude, and thereby determine the modulation state of the message element. 16QAM encodes 4 bits per message element.

Figure 1B:
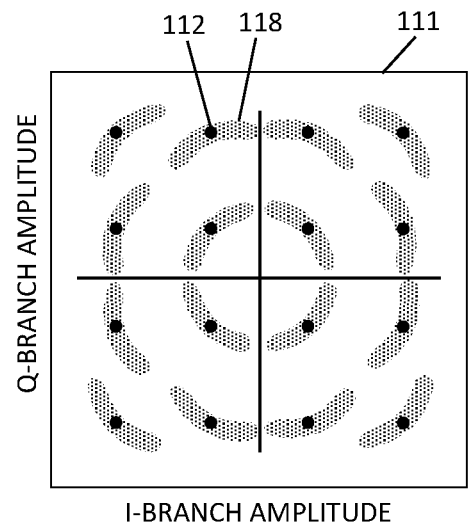
FIG. 1B is a schematic showing an exemplary embodiment of the effect of phase noise on a 16QAM constellation chart, according to prior art.

FIG. 1B is a schematic showing an exemplary embodiment of the effect of phase noise on a 16QAM constellation chart, according to prior art. As depicted in this prior-art example, the modulation states 112 of a 16QAM constellation chart 111 can be distorted ("smeared out") by phase noise in a characteristic way as indicated by phase distortion clouds 118. The depicted distortions would be caused by moderate phase noise at moderate frequencies; at high frequencies it is much worse. If the same modulation scheme were attempted at the much higher frequencies planned for future wireless operation, the phase noise would be much larger than depicted, and the phase-noise clouds would substantially overlap, resulting in frequent message faults. Hence the need for strategies to enable communication despite strong phase distortions.

Figure 2A:
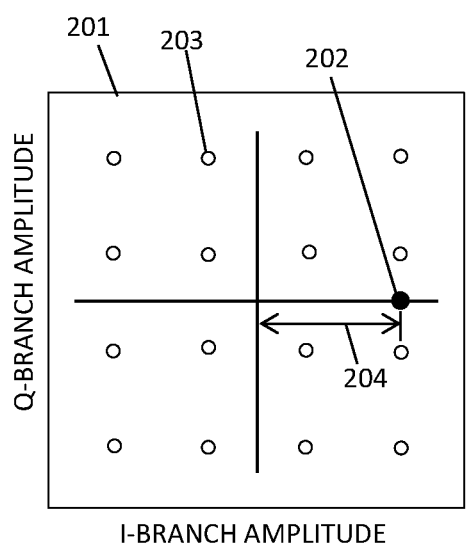
FIG. 2A is a schematic showing an exemplary embodiment of a single-branch reference signal as transmitted, according to some embodiments.

FIG. 2A is a schematic showing an exemplary embodiment of a single-branch reference signal as transmitted, according to some embodiments. As depicted in this non-limiting example, a constellation chart 201 for 16QAM is shown with various modulation states as circles 203 indicating the I and Q branch amplitudes of each state 203. Also shown is a single dot indicating a single-branch reference signal 202, as transmitted by a transmitter, without phase noise. In this case, the I-branch of the single-branch reference signal 202 is amplitude modulated according to the maximum branch amplitude level 204 of the modulation scheme, while the Q-branch has zero amplitude. Thus the single-branch reference signal 202 has an initial sum-signal amplitude 204 equal to the maximum branch amplitude of the modulation scheme, and an initial sum-signal phase of zero degrees. The single-branch reference signal 202 is distinct from all of the 16QAM allowed states 203, since the allowed states generally do not have a zero-amplitude branch, do not have a sum-signal amplitude equal to one of the branch amplitude levels of the modulation scheme, and do not have a sum-signal phase of zero degrees.

In other embodiments, the single-branch reference signal may be transmitted with zero amplitude in the I-branch and a non-zero amplitude in the Q-branch instead of the depicted version. Alternatively, the single-branch reference signal may be transmitted with equal amplitudes in both branches with 45 degree initial phase, or some other phase upon transmission, so long as the receiver knows the initial amplitude and phase. The receiver, upon measuring the I and Q branches as-received, can calculate the phase rotation angle due to phase noise according to the received I and Q branch amplitudes. The receiver can then receive a message and correct each message element by de-rotating by the phase rotation angle, and then demodulate according to the corrected branch amplitudes of the message element.

In some embodiments, the receiver may determine the sum-signal amplitude and sum-signal phase of a single-branch reference signal, by measuring properties of the as-received waveform directly, instead of separating the I and Q branches. For example, the receiver can calculate a phase rotation angle by comparing the received phase to the transmitted phase of the single-branch reference signal. The receiver can then subtract the phase rotation angle from each of the message elements, then separate the corrected I and Q branches of the message elements, and thereby demodulate the message with phase noise negated.

Figure 2B:
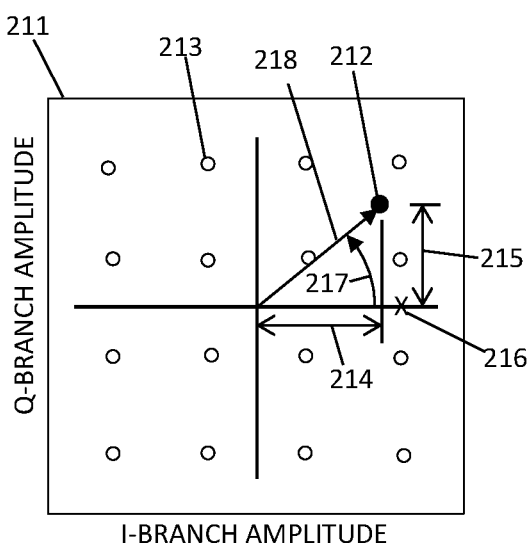
FIG. 2B is a schematic showing an exemplary embodiment of a single-branch reference signal as received, according to some embodiments.

FIG. 2B is a schematic showing an exemplary embodiment of a single-branch reference signal as received, according to some embodiments. As depicted in this non-limiting example, a constellation chart 211, such as that of the previous figure, includes 16QAM modulation states 213. Also shown is a single-branch reference signal 212 as-received, including phase noise that rotates the phase through a phase rotation angle 217 relative to the initial phase, which is zero degrees since Q is initially zero amplitude. The as-received I-branch amplitude 214 is smaller than the transmitted I-branch amplitude 204 due to the rotation, and the Q-branch amplitude 215 has been increased due to the rotation. For comparison, the initial transmitted modulation is shown as an "X" 216. The phase noise causes a phase rotation by the phase rotation angle 217, but the sum-signal amplitude 218 as-received is the same as the sum-signal amplitude 204 as-transmitted.

The receiver can measure the amplitudes of the as-received I and Q branches, calculate the phase rotation angle (as the arctan(Q/I)), and then use that angle to negate the phase noise in message elements. Each single-branch reference signal can correct the phase in message elements transmitted in the same symbol-time, and optionally in adjacent or other closely proximate symbol-times, depending on the frequency spectrum of the phase noise. In a first embodiment, the receiver can determine the phase rotation angle, then receive and process the message elements by separating their I and Q branch signals, measuring the I and Q branch amplitudes of each message element, correcting the message branch amplitudes according to the phase rotation angle, and then demodulating the message by comparing the corrected branch amplitudes to the predetermined amplitude levels of the modulation scheme. For example, the receiver can calculate the sum-signal amplitude and sum-signal phase of each message element from the received I and Q branch amplitudes, then subtract the phase rotation angle from the sum-signal phase, and then calculate the corrected I and Q amplitudes according to the corrected sum-signal phase. The sum-signal amplitude is generally unchanged by phase noise.

In a second embodiment, the receiver can determine the phase rotation angle as described, and can then adjust the local time-base offset or phase zero to negate the phase rotation angle. Alternatively, and equivalently, the receiver can adjust a time offset equal to the phase rotation angle divided by 2πf, where f is the frequency. In either case, the receiver can then separate the I and Q branches using that adjusted time-base, with the phase noise negated.

In a third embodiment, the receiver can determine the phase rotation angle, and then adjust the branch-separation phases of the I and Q branches before processing the message elements. (The branch-separation phase is the phase at which the receiver determines the I and Q branch amplitudes.) The branch-separation phase is normally zero for the I-branch and 90 degrees for the Q-branch (or ±45 degrees if carrier suppression is enforced). To negate phase noise, the receiver can instead use a branch-separation phase of −θ for the I-branch, and 90-θ for the Q-branch (with θ representing the phase rotation angle). The receiver can then separate and processes the two branches at those revised phases, with phase noise largely negated.

After determining the de-rotated I and Q branch amplitudes by any of these methods, or other signal processing methods that artisans may devise after reading this disclosure, the receiver can then demodulate the message element by comparing the corrected I and Q amplitudes to the predetermined amplitude levels of the modulation scheme, with the effects of phase noise largely removed.

Figure 3:
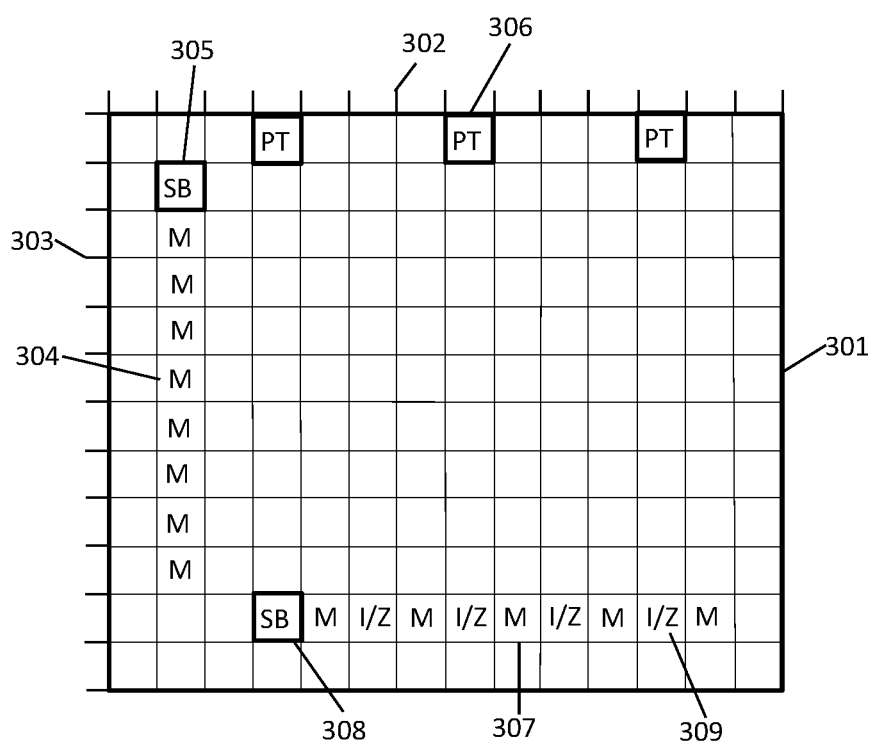
FIG. 3 is a schematic showing an exemplary embodiment of a resource grid including messages, according to some embodiments.

FIG. 3 is a schematic showing an exemplary embodiment of a resource grid including messages, according to some embodiments. As depicted in this non-limiting example, a resource grid 301 is defined by symbol-times 302 and subcarriers 303. A first message "M" 304 is frequency-spanning (occupying multiple subcarriers at a single symbol-time) and is headed by a single-branch reference signal 305 configured to provide phase and amplitude modulation information for demodulating the rest of the message 304. In this case, the single-branch reference signal 305 is a single resource element originally transmitted with an I-branch amplitude according to the maximum branch amplitude level of the modulation scheme, and a Q-branch transmitted with zero amplitude. The receiver can measure the as-received I and Q signals, measure their amplitudes, and calculate the sum-signal phase according to a ratio of the Q and I amplitudes. The sum-signal phase is non-zero in this case, due to phase noise. Since the initial phase was zero, the received sum-signal phase equals the phase rotation angle. The receiver can also calculate the sum-signal amplitude as the root-sum-square (square root of the sum of the squares) of the as-received I and Q amplitudes. The receiver can use the sum-signal amplitude of the single-branch reference signal to update the predetermined amplitude levels of the modulation scheme, and thereby mitigate amplitude noise. For example, the receiver can determine a "correction ratio", which is equal to the sum-signal amplitude of the single-branch reference signal divided by the initial amplitude of the I-branch. Normally the powered branch of the single-branch reference signal is set to the largest branch amplitude of the modulation scheme or the largest sum-signal amplitude (or other known amplitude of the modulation scheme). The receiver can then multiply all of the predetermined amplitude levels of the modulation scheme by the correction ratio, and thereby mitigate the current amplitude noise.

The receiver can mitigate phase noise by subtracting the phase rotation angle from each of the message elements, and can mitigate amplitude noise by adjusting the predetermined amplitude levels of the modulation scheme according to the calculated sum-signal amplitude of the single-branch reference signal. The figure shows the single-branch reference signal 305 in the same symbol-time as the message 304. However, in many cases, the message may be in an adjacent symbol-time to the reference signal, or spaced apart from the reference signal by two or three or more symbol-times, depending on how rapidly the phase noise changes over time. In general, the receiver can mitigate both amplitude noise and phase noise in multiple messages at multiple symbol-times, using the amplitude and phase information provided in the single-branch reference signal 305, with an overhead burden of just one resource element.

Also shown is a time-spanning message 307, that is, a message occupying multiple symbol-times at a single subcarrier. The message 307 includes a single-branch reference signal 308 in which the I-branch equals the maximum branch amplitude of the modulations scheme and the Q-branch has zero amplitude. As mentioned, the receiver can recalibrate the predetermined amplitude levels of the modulation scheme by determining the sum-signal amplitude of the reference 308, and can negate phase noise by calculating a sum-signal phase of the reference 308 as-received. The message includes message elements "M" in which both I and Q branches are amplitude-modulated according to the message content, and at least one single-branch reference signal "I/Z" 309 in which the I branch is amplitude-modulated according to the message content, but the Q-branch is modulated as zero amplitude, upon transmission. Thus the "I/Z" reference 309 can provide phase noise mitigation according to the Q-branch, and can also provide further message content which is encoded in the non-zero branch (such as the I-branch), as-transmitted. The receiver can then negate phase noise according to the sum-signal phase, and can demodulate part of the message according to the sum-signal amplitude. For example, if the modulation scheme has 4 predetermined amplitude levels (such as 16QAM), the sum-signal amplitude can convey 2 bits of message information, while the sum-signal phase can provide phase-noise mitigation.

In the depicted case, the message 307 includes one single-branch reference signals for every two message elements. The receiver can update the phase rotation angle according to the ratio of received Q and I branches in those references 309, and can demodulate message bits according to the sum-signal amplitude (which is a measure of the originally transmitted I-branch amplitude). Thus the depicted message 307 provides a phase noise correction periodically at multiple symbol-times throughout the message 307. In the depicted case, the overhead burden is one branch for each two message elements, while three branches carry message data for each two message elements (except for the first one 308, which instead indicates the maximum amplitude level for calibration).

Also shown is a series of phase-tracking single-branch reference signals 306 "PT" placed periodically in the resource grid 301 on one subcarrier, which in this case is the first subcarrier, but could be any one of the subcarriers in the block. For example, the base station can transmit such a phase-tracking single-branch reference signal 306 during each resource grid portion that has been scheduled for downlink, and optionally for each portion that is unscheduled, to provide near-continuous phase noise updating. Each of the phase-tracking single-branch reference signals 306 is transmitted with an I branch modulated at a standard amplitude, and a Q-branch modulated at zero amplitude. As-received, the phase-tracking single-branch reference signals 306 are generally phase-rotated due to phase noise, causing some of the I-branch amplitude to rotate into the Q-branch. The receiver can measure the I and Q amplitudes of each of the phase-tracking single-branch reference signals 306, and thereby calculate an updated rotation angle, at multiple symbol-times in the grid. Receivers can then demodulate their messages elsewhere in the grid, instead of including user-specific phase tracking elements in the messages. Hence the individual messages can use the phase-noise mitigation provided by the phase-tracking single-branch reference signals 306 to correct the phase noise before demodulating their message elements. For example, a base station may insert such phase-tracking single-branch reference signals periodically in the downlink channels, thereby enabling each user to mitigate phase noise in its received messages.

In some embodiments, the receiver (such as a user device) can prompt the transmitter (such as a base station) to include single-branch reference signals for phase-tracking periodically in the resource grid, when the receiver determines that the rate of phase faults is above a threshold. Likewise, the receiver can include a single-branch reference signal, such as 309, periodically within an uplink message, while continuing to encode message bits in the non-zero branch of each single-branch reference signal within the message, as mentioned.

The phase-tracking single-branch reference signals 306 are shown repeated every fourth symbol-time in this case. Depending on properties of the phase noise (such as the size of the phase rotation angle on average, or the time over which the phase rotation angle typically changes), the phase-tracking single-branch reference signals 306 may be placed closer together, such as 2 or 3 symbol-times apart, or farther apart such as 1 or 2 reference signals per subframe. In extreme phase noise cases, the phase-tracking single-branch reference signals 306 may be included in each downlink symbol-time.

The figure shows a variety of configurations for implementing the single-branch reference signals for phase-noise mitigation. In some embodiments, mitigation procedures may be standardized and compulsory, such as applying a single-branch reference signal at the start of each message or periodically within time-spanning messages, and on downlink, in certain symbol-times of each subframe for example. In other embodiments, the single-branch reference signals may be applied only when desired for enhanced message reliability, such as at high frequencies or when the user device has a noisy clock for example. Options and choices, as well as conventions and formats, may be provided in system information files, such as the synchronization files and initial access messages that all user devices receive upon registering with a base station. Alternatively, if the use of such mitigation is to be voluntary, a user device may request same upon joining a network.

Figure 4:
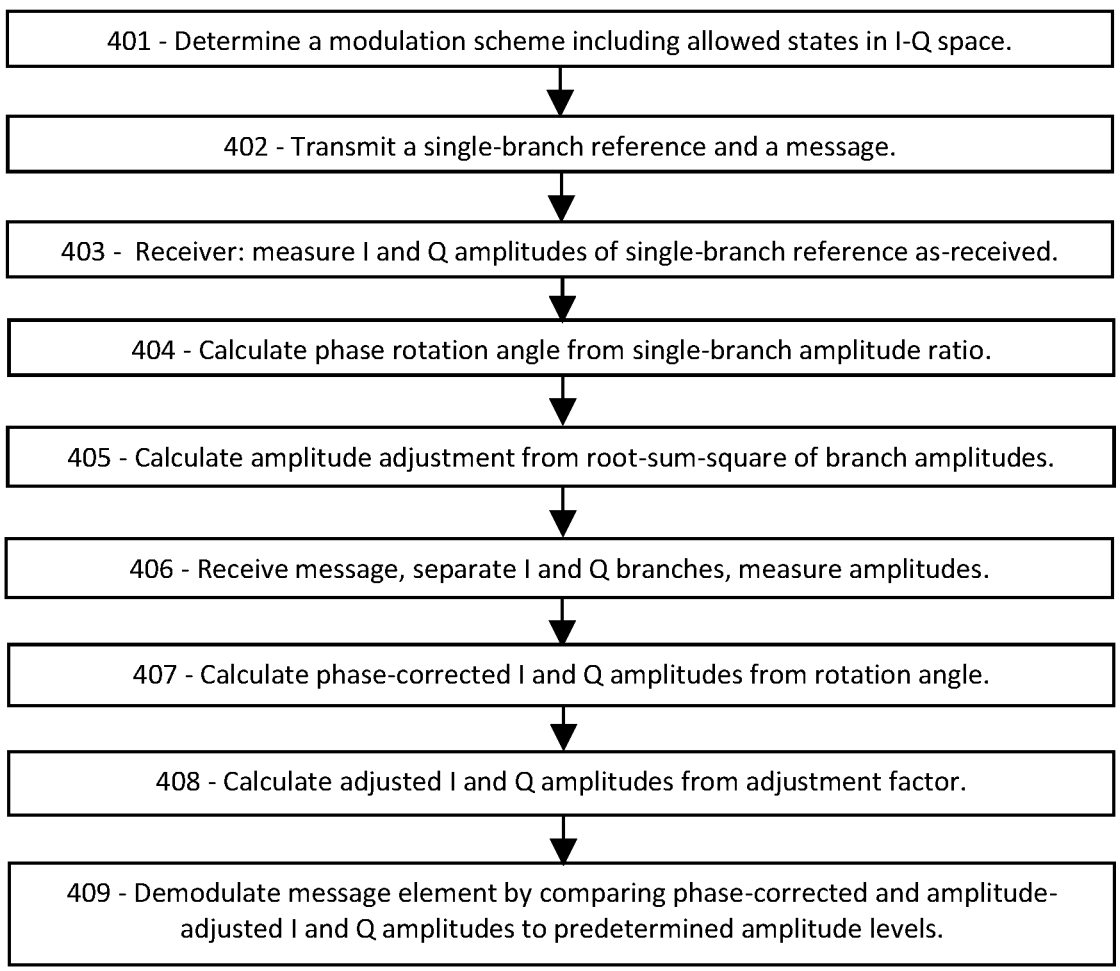
FIG. 4 is a flowchart showing an exemplary embodiment of a procedure for mitigating phase noise in a message, according to some embodiments.

FIG. 4 is a flowchart showing an exemplary embodiment of a procedure for mitigating phase noise in a message, according to some embodiments. As depicted in this non-limiting example, at 401 a transmitter and a receiver determine or receive or otherwise learn of a modulation scheme that includes integer Nstates allowed modulation states in an I-Q space, such as 16QAM, and a plurality of predetermined amplitude levels, such as −3, −1, +1, +3 of 16QAM. At 402, the transmitter modulates a message according to the modulation scheme, and transmits a single-branch reference signal followed (in time or in frequency) by the message. The single-branch reference signal is transmitted with a known sum-signal phase. In this example, the transmitted Q branch amplitude is zero, so the transmitted sum-signal phase is also zero. The single-branch reference signal is transmitted with a known sum-signal amplitude. In this example, the transmitted I branch amplitude equals the maximum branch amplitude level (+3 units) of the modulation scheme, and the Q amplitude is zero, so the transmitted sum-signal amplitude equals the maximum branch amplitude level.

At 403, the receiver receives the single-branch reference signal and measures the received reference I and Q branch amplitudes therein. Generally, due to phase noise, the received reference I and Q branch amplitudes are different from those transmitted. At 404, the receiver calculates a phase rotation angle based on the received reference I and Q branch amplitudes. For example, the receiver can calculate the arctangent of the received reference Q amplitude divided by the received reference I amplitude. In this example, the transmitted sum-signal phase is zero degrees; hence the phase rotation angle is directly equal to the received reference sum-signal phase. In other embodiments, the single-branch reference signal may be transmitted with a different sum-signal phase, such as 90 degrees. In each case, the transmitted phase is known to the receiver, so the receiver can readily determine the phase rotation angle from the received reference sum-signal phase.

At 405, the receiver calculates a received reference sum-signal amplitude (sometimes called a waveform magnitude) from the received reference branch amplitudes, such as the root-sum-square of the received reference I and Q amplitudes. The receiver then calculates an amplitude adjustment by comparing the received reference sum-signal amplitude to the transmitted reference sum-signal amplitude. In this case the transmitted reference sum-signal amplitude is the transmitted I branch amplitude, which equals the maximum branch amplitude of the modulation scheme, or +3 units for 16QAM. The receiver is expected to know the transmitted reference sum-signal amplitude and phase, or equivalently, the transmitted I and Q branch amplitudes.

The receiver can then calculate an amplitude adjustment factor as a difference or as a ratio, depending on the implementation. For mitigating additive noise, the amplitude adjustment factor equals the received reference sum-signal amplitude minus the transmitted reference sum-signal amplitude, since the received version includes additive amplitude noise. Hence, the receiver can mitigate additive amplitude noise by subtracting the amplitude adjustment factor from the message elements, as discussed below. In other implementations, the amplitude adjustment factor may be calculated as a ratio of the transmitted and received reference sum-signal amplitudes, in which case the receiver can mitigate complex amplitude noise by multiplying or dividing the message amplitudes by that factor. In this example, additive noise is assumed.

At 406, the receiver receives a message element, separates the received message I and Q branches, and measures the received message I and Q amplitudes. At 407, the receiver determines a received message sum-signal phase according to a ratio of the received message Q amplitude divided by the received message I amplitude. The receiver then subtracts the phase rotation angle from the received message sum-signal phase, thereby determining a corrected message sum-signal phase.

At 408, the receiver determined a received message sum-signal amplitude such as the root-sum-square of the received message I and Q amplitudes. The receiver than subtracts the amplitude adjustment factor from the message sum-signal amplitude, thereby determining a phase-corrected and amplitude-adjusted message sum-signal amplitude and phase. The receiver then calculates mitigated I and Q amplitudes from the corrected adjusted sum-signal amplitude and phase. For example, the receiver can calculate the final I branch amplitude as the amplitude-adjusted sum-signal amplitude times the cosine of the phase-corrected sum-signal phase, and the final Q branch amplitude as the amplitude-adjusted sum-signal amplitude times the sine of the phase-corrected sum-signal phase.

At 409, the receiver demodulates the message element by comparing the phase-corrected, amplitude-adjusted final message I and Q amplitudes to the predetermined amplitude levels of the modulation scheme, selecting the closest match in each case.

In an alternative embodiment, the receiver may amplitude-adjust the set of predetermined amplitude levels instead of the message sum-signal amplitude, thereby causing the calibration set to vary and track the varying noise environment in real-time. In other embodiments, the receiver can phase-correct the assumed transmitted sum-signal phase instead of the message sum-signal phase. It is immaterial whether the phase and amplitude corrections are applied to the transmitted or received or predetermined values, so long as it is done consistently.

In summary, the receiver has used its knowledge of the transmitted reference branch amplitudes to calculate a phase rotation angle and an amplitude adjustment factor, and has thereby mitigated both the phase noise and the amplitude noise in the demodulated the message element.

Figure 5:
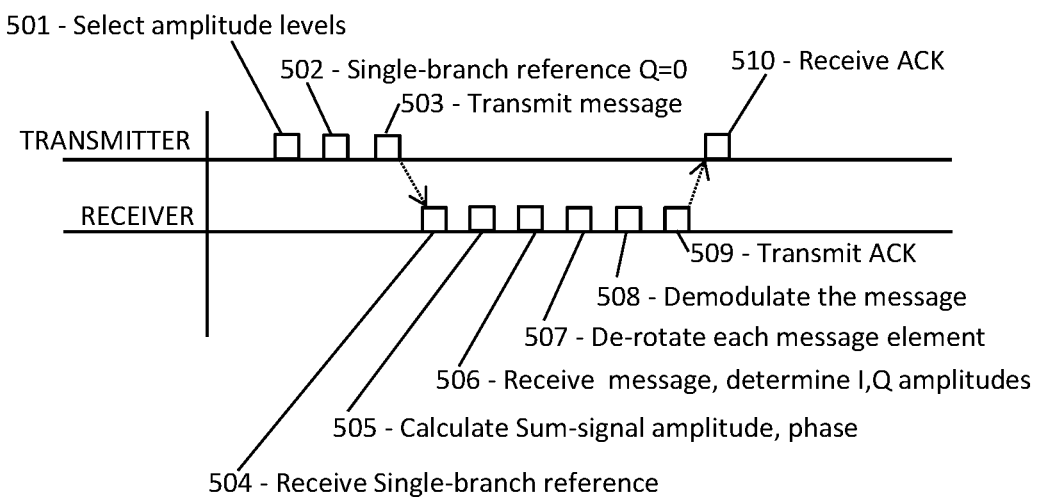
FIG. 5 is a sequence chart showing an exemplary embodiment of a procedure for transmitting and receiving a message with phase-noise mitigation, according to some embodiments.

FIG. 5 is a sequence chart showing an exemplary embodiment of a procedure for transmitting and receiving a message with phase-noise mitigation, according to some embodiments. As depicted in this non-limiting example, actions of a transmitter are shown on the first line, of a receiver on the second line, and time is horizontal with arrows showing causation. At 501, a transmitter determines a modulation scheme with predetermined amplitude levels and quadrature modulation of orthogonal branch signals. At 502, the transmitter transmits a single-branch reference signal consisting of one resource element with an I-branch having the maximum branch amplitude level of the modulation scheme, and the Q-branch having zero amplitude. At 503, the transmitter then transmits the rest of the message elements.

At 504, the receiver receives the single-branch reference signal and at 505 determines a sum-signal amplitude and a sum-signal phase according to the I and Q branch amplitudes as-received. The receiver recalibrates a set of predetermined branch amplitude levels of the modulation scheme according to the sum-signal amplitude of the single-branch reference signal.

At 506, the receiver receives the message and determines the I and Q amplitudes, including phase noise and amplitude noise, of each message element. At 507, the receiver corrects the branch amplitudes of each message element, by de-rotating them opposite to the phase rotation angle, as determined from the single-branch reference signal. At 508, the receiver demodulates the corrected branch amplitudes by comparing the phase-corrected branch amplitudes to the recalibrated amplitude levels of the modulation scheme. At 509, the receiver transmits an acknowledgement which the transmitter receives at 510.

Thus the message has been transmitted with both amplitude and phase corruption, but by using the single-branch reference signal to mitigate each branch of each message element, the receiver has mitigated both the amplitude and phase noise, and thereby demodulated the message to recover its original content.

The de-rotation of the message element may be performed in a variety of ways, depending on implementation. In one embodiment, the receiver can calculate the sum-signal amplitude and sum-signal phase of a message element, subtract the phase rotation angle from the sum-signal phase to get a corrected sum-signal phase of the message element, and then reconstruct the branches trigonometrically. More specifically, the receiver can calculate the corrected I-branch amplitude of the message element as the sum-signal amplitude times the cosine of the corrected sum-signal phase, and can calculate the corrected Q-branch amplitude as the sum-signal amplitude times the sine of the corrected sum-signal phase. Artisans may devise other, equivalent, calculation procedures for determining the message element branch amplitudes with the phase noise removed.

Due to the many options and variations disclosed herein, and other versions derived therefrom by artisans after reading this disclosure, it would be helpful for a wireless standards committee to establish conventions governing the use, incidence, and formats of single-branch reference signals, so that future wireless users can enjoy phase-noise mitigation transparently with each communication.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a wireless receiver to demodulate a message, the method comprising:
  a) receiving a single-branch reference signal comprising a resource element modulated according to a reference I-branch signal multiplexed with an orthogonal reference Q-branch signal;
  b) measuring a reference I-branch amplitude of the reference I-branch signal and a reference Q-branch amplitude of the reference Q-branch signal;
  c) calculating a phase rotation angle according to a ratio of the reference I-branch amplitude and the reference Q-branch amplitude;
  d) receiving a message comprising message elements, each message element modulated according to an I-branch signal having an I-branch amplitude, multiplexed with an orthogonal Q-branch signal having a Q-branch amplitude;
  e) adjusting the I-branch amplitude and the Q-branch amplitude according to the phase rotation angle;
  f) comparing the adjusted I-branch amplitude to a plurality of predetermined amplitude levels, and selecting which of the predetermined amplitude levels is closest to the adjusted I-branch amplitude; and
  g) comparing the adjusted Q-branch amplitude to the plurality of predetermined amplitude levels, and selecting which of the predetermined amplitude levels is closest to the adjusted Q-branch amplitude.

2. The method of claim 1, wherein the message is received according to 5G or 6G technology.

3. The method of claim 1, further comprising:
  a) determining a reference phase angle comprising an arctangent of a ratio of the reference Q-branch amplitude divided by the reference I-branch amplitude; and b) calculating the phase rotation angle by subtracting the received reference phase angle from a predetermined initial reference phase angle.

4. The method of claim 3, wherein the initial reference phase angle is zero degrees.

5. The method of claim 1, further comprising:
a) determining a reference sum-signal amplitude equal to a square root of a sum of the reference I-branch amplitude squared plus the reference Q-branch amplitude squared;
b) determining a correction ratio comprising the reference sum-signal amplitude divided by a previously determined amplitude level; and
c) multiplying each of the predetermined amplitude levels of the plurality by the correction ratio.

6. The method of claim 1, further comprising:
a) determining, according to a system information file, a format of the single-branch reference signal;
b) wherein the format of the single-branch reference signal comprises an initial reference phase and an initial reference amplitude.

7. The method of claim 1, further comprising:
a) determining a rate of phase faults, wherein each phase fault is a message element that is incorrectly demodulated due to phase noise; and
b) if the rate of phase faults exceeds a predetermined threshold, transmitting a message requesting that each subsequent transmission to the receiver should include at least one single-branch reference signal.

8. The method of claim 1, wherein a base station is configured to periodically transmit a single-branch reference signal during each interval that is scheduled for downlink communication.

9. The method of claim 1, wherein:
a) the message includes or is preceded by a first single-branch reference signal; and
b) if the message occupies multiple symbol-times at a single subcarrier frequency, then the message further includes at least one additional single-branch reference signal embedded in the message.

10. The method of claim 1, further comprising:
a) receiving a particular message element comprising a received I-branch amplitude and a received Q-branch amplitude, wherein one branch, of the received I and Q branches, is transmitted with zero amplitude;
b) calculating, according to a ratio of the received I-branch and Q-branch amplitudes, a received phase correction;
c) calculating, according to a square root of a sum of the received I-branch amplitude squared plus the received Q-branch amplitude squared, a received sum-signal amplitude; and
d) comparing the received sum-signal amplitude to the plurality of predetermined amplitude levels.

11. The method of claim 10, further comprising:
a) after receiving the particular message element, receiving a subsequent message element comprising a subsequent I-branch amplitude and a subsequent Q-branch amplitude;
b) calculating a sum-signal amplitude comprising a square root of a sum of the subsequent I-branch amplitude squared plus the subsequent Q-branch amplitude squared;
c) calculating a sum-signal phase of the subsequent message element comprising an arctangent of a ratio of the subsequent I-branch amplitude and the subsequent Q-branch amplitude;

d) calculating a corrected phase comprising the sum-signal phase minus the received phase correction; and
e) calculating a corrected I-branch amplitude comprising the sum-signal amplitude times a cosine of the corrected phase, and calculating a corrected Q-branch amplitude comprising the sum-signal amplitude times a sine of the corrected phase.

12. A wireless transmitter configured to:
a) use a modulation scheme comprising:
   i) a first branch multiplexed with an orthogonal second branch; and
   ii) a plurality of predetermined amplitude levels;
b) transmit a single-branch reference signal comprising a reference first branch multiplexed with a reference second branch which is orthogonal to the reference first branch, wherein:
c) the reference first branch is amplitude modulated according to one of the predetermined amplitude levels; and
d) the reference second branch is amplitude modulated with zero amplitude.

13. The wireless transmitter of claim 12, wherein:
a) the plurality of predetermined amplitude levels comprises a maximum predetermined amplitude level; and
b) the reference first branch is amplitude modulated according to the maximum predetermined amplitude level.

14. The wireless transmitter of claim 12, wherein:
a) the plurality of predetermined amplitude levels comprises a maximum predetermined amplitude level; and
b) the first branch is amplitude modulated according to the maximum predetermined amplitude level times the square root of two.

15. The wireless transmitter of claim 12, further configured to:
a) transmit a message modulated according to the modulation scheme, wherein:
b) the message starts concurrently with, or less than 3 symbol-times later than, the single-branch reference signal.

16. The wireless transmitter of claim 12, further configured to:
a) transmit a message comprising message elements, each message element comprising a first branch multiplexed with an orthogonal second branch;
b) wherein at least one message element is transmitted with the first branch modulated according to one of the predetermined amplitude levels, and with the second branch modulated at zero amplitude.

17. Non-transitory computer-readable media in a wireless receiver, the media containing instructions that when implemented in a computing environment cause a method to be performed, the method comprising:
a) receiving a single-branch reference signal comprising, in exactly one resource element, a reference I-branch amplitude multiplexed with an orthogonal reference Q-branch amplitude;
b) measuring the reference I-branch amplitude and the reference Q-branch amplitude;
c) calculating a reference sum-signal amplitude comprising a square root of a sum of the reference I-branch amplitude squared plus the reference Q-branch amplitude squared;
d) calculating a reference sum-signal phase comprising an arctangent of a ratio of the reference Q-branch amplitude divided by the reference I-branch amplitude;

e) receiving a message comprising modulated message elements;
f) for each message element:
  i) measuring a received I-branch amplitude and a received Q-branch amplitude;
  ii) calculating a received sum-signal phase according to an arctangent of a ratio of the received Q-branch amplitude divided by the received I-branch amplitude; and
  iii) calculating an adjusted sum-signal phase by subtracting the reference sum-signal phase from the received sum-signal phase.

18. The media of claim 17, the method further comprising, for each message element:
  a) calculating a received sum-signal amplitude according to a square root of a sum of the received I-branch amplitude squared plus the received Q-branch amplitude squared;
  b) calculating an adjusted I-branch amplitude comprising the received sum-signal amplitude times a cosine of the adjusted sum-signal phase; and
  c) calculating an adjusted Q-branch amplitude comprising the received sum-signal amplitude times a sine of the adjusted sum-signal phase.

19. The media of claim 18, the method further comprising, for each message element:
  a) comparing the adjusted I-branch amplitude to a plurality of predetermined amplitude levels, and selecting the predetermined amplitude level closest to the adjusted I-branch amplitude; and
  b) comparing the adjusted Q-branch amplitude to the plurality of predetermined amplitude levels, and selecting the predetermined amplitude level closest to the adjusted Q-branch amplitude.

20. The media of claim 17, the method further comprising, for each message element:
  a) calculating an amplitude correction ratio comprising the reference sum-signal amplitude divided by a maximum amplitude level in a plurality of predetermined amplitude levels; and
  b) for each of the predetermined amplitude levels in the plurality, calculating a corrected amplitude level comprising the predetermined amplitude level times the correction ratio.

* * * * *